US012643802B2

(12) United States Patent
(10) Patent No.: US 12,643,802 B2
(45) Date of Patent: Jun. 2, 2026

Maguire-Boyle et al.

(54) USE OF AMINE MODIFIED NANOPARTICLES FOR H2S SCAVENGING

(71) Applicant: NISSAN CHEMICAL AMERICA CORPORATION, Houston, TX (US)

(72) Inventors: Samuel James Maguire-Boyle, Spring, TX (US); John Edmond Southwell, Glen Ellyn, IL (US)

(73) Assignee: Nissan Chemical America Corporation, Houston, TX (US)

( * ) Notice: Subject to any disclaimer, the term of this patent is extended or adjusted under 35 U.S.C. 154(b) by 335 days.

(21) Appl. No.: 18/546,755

(22) PCT Filed: Feb. 18, 2022

(86) PCT No.: PCT/US2022/017036

§ 371 (c)(1),
(2) Date: Aug. 16, 2023

(87) PCT Pub. No.: WO2022/178286

PCT Pub. Date: Aug. 25, 2022

(65) Prior Publication Data

US 2024/0158265 A1 May 16, 2024

Related U.S. Application Data

(60) Provisional application No. 63/151,217, filed on Feb. 19, 2021.

(51) Int. Cl.

*C02F 1/28* (2023.01)
*C02F 101/10* (2006.01)

(52) U.S. Cl.

CPC ........ *C02F 1/288* (2013.01); *C02F 2101/101* (2013.01); *C02F 2305/08* (2013.01)

(58) Field of Classification Search

CPC .. C10G 17/04; C10G 2300/207; C10G 25/02; C10G 29/02; C10G 29/20; C10G 17/09;
(Continued)

(56) References Cited

U.S. PATENT DOCUMENTS

| | | | |
|---|---|---|---|
| 1,991,765 | A | 2/1935 | Marks |
| 2,606,873 | A | 8/1952 | Cardwell et al. |

(Continued)

FOREIGN PATENT DOCUMENTS

| | | | |
|---|---|---|---|
| CA | 2769060 | A1 | 8/2013 |
| CN | 101591555 | B | 7/2012 |

(Continued)

OTHER PUBLICATIONS

Amit Singh et al., Copper Coated Silica Nanoparticles for Odor Removal, Sep. 26, 2010, 26(20), American Chemical Society, pp. 15837-15844.

(Continued)

*Primary Examiner* — Benjamin L Lebron
*Assistant Examiner* — Bernadette Karen McGann
(74) *Attorney, Agent, or Firm* — Nixon & Vanderhye, PC

(57) ABSTRACT

A process to remove $H_2S$ from a stream is described and claimed. The process comprises the steps of adding an amine-functionalized silica nanoparticle composition, and optionally a iriazine. The stream is selected from the group consisting of Oil streams, Gas streams, $CO_2$ point source purification streams and Geothermal Energy System streams.

12 Claims, 9 Drawing Sheets

(58) Field of Classification Search
CPC ...... C10G 25/003; C10G 29/04; C10G 29/16; B01D 2251/602; B01D 2252/103; B01D 2252/20436; B01D 2253/106; B01D 2253/25; B01D 2253/304; B01D 2255/30; B01D 2256/22; B01D 2257/304; B01D 53/02; B01D 53/025; B01D 53/52; B01D 53/78; B01D 53/8612; B01D 2252/20415; B01D 2253/104; B01D 2253/1122; B01D 2255/2073; B01D 2255/20738; B01D 2255/20761; B01D 2255/20792; B01D 2256/24; B01D 53/80; C02F 1/683; C02F 2101/101; C02F 2103/34
See application file for complete search history.

(56) References Cited

U.S. PATENT DOCUMENTS

| | | | | |
|---|---|---|---|---|
| 3,514,410 | A | 5/1970 | Engle et al. | |
| 3,585,069 | A | 6/1971 | Owsley | |
| 3,669,613 | A | 6/1972 | Knox et al. | |
| 4,220,500 | A | 9/1980 | Baba et al. | |
| 4,289,639 | A | 9/1981 | Buske | |
| 4,310,435 | A | 1/1982 | Frenier | |
| 4,680,127 | A | 7/1987 | Edmondson | |
| 4,808,765 | A | 2/1989 | Pearce et al. | |
| 4,978,512 | A | 12/1990 | Dillon et al. | |
| 5,085,842 | A | 2/1992 | Porz et al. | |
| 5,208,369 | A | 5/1993 | Crump et al. | |
| 5,980,845 | A | 11/1999 | Cherry | |
| 7,141,518 | B2 | 11/2006 | Macdonald et al. | |
| 7,438,875 | B2 | 10/2008 | Do et al. | |
| 7,985,881 | B2 | 7/2011 | Westlund et al. | |
| 9,006,508 | B2 | 4/2015 | Kanazirev et al. | |
| 9,463,989 | B2 | 10/2016 | Menendez et al. | |
| 11,059,079 | B1 | 7/2021 | Allred, Jr. | |
| 11,077,474 | B1 | 8/2021 | Allred, Jr. | |
| 11,512,241 | B2 | 11/2022 | Allred, Jr. | |
| 11,732,181 | B2 | 8/2023 | Allred, Jr. | |
| 12,275,891 | B2 | 4/2025 | Allred, Jr. | |
| 2005/0084438 | A1 | 4/2005 | Do et al. | |
| 2005/0085144 | A1 | 4/2005 | Macdonald et al. | |
| 2009/0065445 | A1 | 3/2009 | Westlund et al. | |
| 2011/0000854 | A1 | 1/2011 | Nichols et al. | |
| 2013/0004393 | A1 | 1/2013 | Menendez et al. | |
| 2013/0204065 | A1 | 8/2013 | Kanazirev et al. | |
| 2014/0155669 | A1 | 6/2014 | Slowing et al. | |
| 2016/0237335 | A1* | 8/2016 | Salla ...................... | C09K 8/536 |
| 2018/0044598 | A1* | 2/2018 | Tan ........................ | C10G 29/28 |
| 2018/0291284 | A1 | 10/2018 | Sommese et al. | |
| 2018/0345212 | A1 | 12/2018 | Legaspi Felipe et al. | |
| 2021/0322920 | A1 | 10/2021 | Sahoo et al. | |
| 2025/0243399 | A1 | 7/2025 | Allred, Jr. | |

FOREIGN PATENT DOCUMENTS

| | | | |
|---|---|---|---|
| CN | 102585952 | A | 7/2012 |
| CN | 1106795752 | B | 8/2020 |
| EP | 3566762 | A2 | 11/2019 |
| WO | 9408980 | A1 | 4/1994 |
| WO | 2016019101 | A1 | 2/2016 |
| WO | 2018009497 | A1 | 1/2018 |
| WO | 2020039199 | A1 | 2/2020 |
| WO | 2022178251 | A1 | 8/2022 |
| WO | 2022178286 | A1 | 8/2022 |

OTHER PUBLICATIONS

Faeze Tari et al., Modified and Systematic Synthesis of Zinc Oxidesilica Composite Nanoparticles With Optimum Surface Area as a Proper H2S Sorbent, Apr. 1, 2017, vol. 95, No. 4, Canadian Journal of Chemical Engineering, 7 pages.

Jan M. Bakke, et al. Hydrolysis of 1,3,5-Tris(2-hydroxyethyl)hexahydro-s-triazine and Its Reaction with H2S, Ind. Eng. Chem. Res., vol. 40, 2001, 3 pages.

Hydrogen Sulfide Scavenger (H2S Scavenger), Corrosionpedia, Last updated: Jul. 19, 2024, Retrieved from the Internet URL:https://www.corrosionpedia.com/definition/1645/hydrogen-sulfide-scavenger-h2s-scavenger.

L. Chu et al., Glycidoxypropyltrimethoxysilane Modified Colloidal Silica Coatings, MRS Proceedings, Jan. 1, 1996, 5 pages, vol. 435, XP055524536.

L. Hoven et al., Odour Management Guidance for Refineries, Jan. 1, 2020, pp. 1-93, XP055851362.

Michael Gonser, et al., Simultaneous Control of Subsurface Scale, Corrosion, and H2S Using a Single Capillary String: A Real-World Chemical Application in the Permian Basin, 2022 SPE Annual Technical Conference and Exhibition, Oct. 5, 2022, 20 pages.

Mohamed Chehimi et al., Surface chemical and thermodynamic properties of [gamma]-glycidoxy-propyltrimethoxysilane-treated alumina: an XPS and IGC study, Journal of Materials Chemistry, Jan. 1, 2001, pp. 533-543, vol. 11, No. 2.

Zeina Abbas et al., Evaluation of CO2 Purification Requirements and the Selection of Processes for Impurities Deep Removal from the CO2 Product Stream, Energy Procedia, 2013, pp. 2389-2396, vol. 37.

Schaack and Chan, $H_2S$ Scavenging: Caustic-based process remains attractive, Oil & Gas Journal, vol. 87, No. 5, pp. 81-82, Jan. 1989.

Schaack and Chan, $H_2S$ Scavenging: Cost estimating depends on location material, Oil & Gas Journal, vol. 87, No. 9, pp. 90-91, Feb. 1989.

Schaack and Chan, $H_2S$ Scavenging: Formaldehyde-methanol, metallic-oxide agents head scavengers list, Oil & Gas Journal, vol. 87, No. 4, pp. 51-55, Jan. 1989.

Schaack and Chan, $H_2S$ Scavenging: Process design guidelines vary widely, Oil & Gas Journal, vol. 87, No. 8, pp. 45-48, Feb. 1989.

International Search Report for PCT/US2022/017036 mailed May 4, 2022, 4 pages.

Written Opinion of the ISA for PCT/US2022/017036 mailed May 4, 2022, 4 pages.

U.S. Appl. No. 18/546,674, filed Aug. 16, 2023, Southwell et al.

U.S. Appl. No. 18/546,662, filed Aug. 16, 2023, Coady et al.

U.S. Appl. No. 18/546,759, filed Aug. 16, 2023, Southwell et al.

U.S. Appl. No. 18/546,664, filed Aug. 16, 2023, Maguire-Boyle et al.

Indonesian Substantive Examination Report Stage I issued Sep. 18, 2025 in related Indonesian Patent Application No. P00202308262, 5 pages.

Vietnamese Office Action dated Aug. 6, 2025 in reiated Vietnamese Patent Application No. 1-2023-06319, 4 pages.

Response to the Indonesian Substantive Examination Report Stage I issued Sep. 18, 2025 in Indonesian Patent Application No. P00202308262, filed on Dec. 16, 2025, 95 pages.

Portela et al., "Spectroscopic evaluation of commercial H2S scavengers", Fuel 216 (2018) 681-685.

* cited by examiner $RNH_2 + H_2S \rightleftharpoons RNH_3^+ + SH^-$

Thymine Uracil Maleimide Melamine

AllylTMS

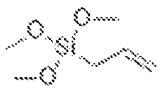

((Chloromethyl)Phenylethyl)TMS

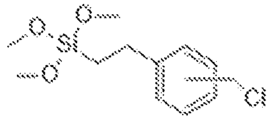

(p-Chloromethyl)PhenylTMS

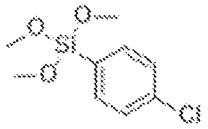

PhenethylTMS

PhenethylTMS

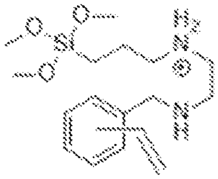

MethacryloxpropylTMS

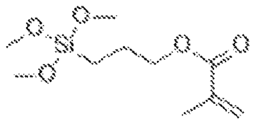

Figure 9.

N-(2-Aminoethyl)-3-AminopropylTMS

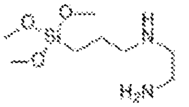

4-Amino-3,3-DimethylbutylTMS

3-AminopropylTMS

n-ButylaminopropylTMS

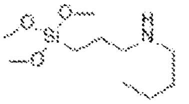

(N,N-Diethylaminoethyl)TMS

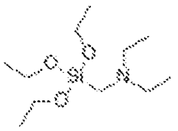

3-(1,3-Dimethylbutylidene) AminopropylTES

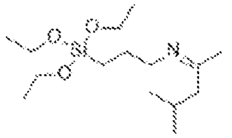

(3-(N-Ethylamino)Isobutyl)TMS

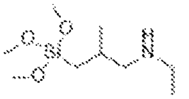

(3-Glycidoxypropyl)TMS

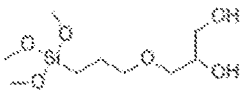

2-(Methoxy(Polyethyleneoxy)Propyl) Heptamethyltrisiloxane

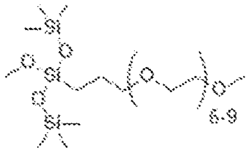

N-MethylaminopropylTMS

TMS-Propoxypolyethyleneoxide

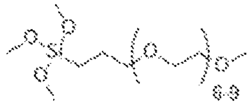

(3-TMSPropyl)Diethylenetriamine

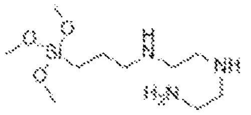

Figure 10.

N,N'-Bis[3-(TES)Propyl] Thiourea
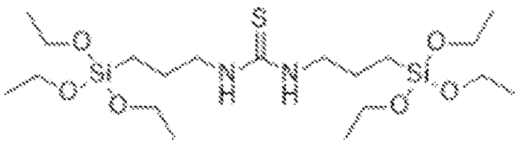
Bis[3-(Triethoxysilyl)Propyl]Disulfide
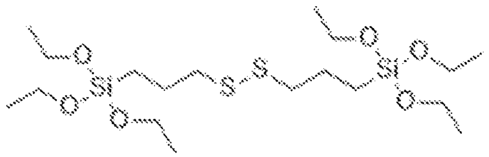
Figure 11.

USE OF AMINE MODIFIED NANOPARTICLES FOR H2S SCAVENGING

CROSS-REFERENCE TO RELATED APPLICATIONS

This application is the U.S. national phase of International Application No. PCT/US2022/017036 filed Feb. 18, 2022 which designated the U.S. and claims priority to U.S. 63/151,217 filed Feb. 19, 2021, the entire contents of each of which are hereby incorporated by reference.

FIELD OF THE INVENTION

This invention is in the field of chemicals used to remove hydrogen sulfide ($H_2S$) from Oil streams, Gas streams, $CO_2$ point source purification and Geothermal Energy Systems.

BACKGROUND OF THE INVENTION

Hydrogen sulfide is present in natural gas from many gas fields. It can also be present in Oil streams, Gas streams, $CO_2$ point source purification and Geothermal Energy Systems.

It is a highly undesirable constituent because it is toxic and corrosive and has a very foul odor. Therefore, several methods for its removal have been developed.

One such method is the injection of an aqueous solution of 1,3,5-tris(2-hydroxyethyl)hexahydro-s-triazine into the gas stream. Triazine is a liquid scavenger so the process is economical up to approximately 50 kg of $H_2S$/day and will remove $H_2S$ down to ca. 5 ppm in streams with relatively low concentrations of $H_2S$. However, because the products and the details of the reaction are not known, the optimal conditions for the $H_2S$ removal cannot always be applied. "Hydrolysis of 1,3,5-Tris(2-hydroxyethyl)hexahydro-s-triazine and Its Reaction with H2S, Ind. Eng. Chem. Res. 2001, 40, 6051-6054, page 6051. See: www.corrosionpedia.com/definition/1645/hydrogen-sulfide-scavenger-h2s-scavenger.

A hydrogen sulfide ($H_2S$) scavenger is a specialized chemical or fuel additive widely used in hydrocarbon and chemical processing facilities. These specialized chemicals react selectively with and remove $H_2S$ to help meet product and process specifications.

Products treated for $H_2S$ include crude oil, fuels, and other refined petroleum products in storage tanks, tanker ships, railcars, and pipelines.

Hydrogen sulfide can cause damage to pipework, either by reacting directly with steel to create an iron sulfide corrosion film, or by increasing the acidity of the liquid/gas mixture in the pipes. When dissolved in water, $H_2S$ may be oxidized to form elemental sulfur. This can also produce an iron sulfide corrosion film when in direct contact with the metal surface. Therefore, it is essential to remove $H_2S$ from crude oil as quickly and efficiently as possible.

Triazine, the most commonly used liquid $H_2S$ scavenger, is a heterocyclic structure similar to cyclohexane, but with three carbon atoms replaced by nitrogen atoms. Oilfield terminology of triazine differs from the IUPAC convention, triazinane.

Three variations of triazine exist, based on the location of the substitution of nitrogen atoms, are 1,2,3-triazine; 1,2,4-triazine and 1,3,5-triazine (aka s-triazine).

Further variations involving substitutions of the hydrogen atoms with other functional groups are used in various industries. The substitutions occurring at any number of the "R" locations, 1, 2, 3, 4, 5,or 6. Different substitutions result in different reactivity with $H_2S$, changes in solubility of triazine, and changes in the solubility of the reactant products (the "R" groups). Consequently, triazine can be "tailored" to better suit the application or disposal considerations.

Direct Injection

In direct-injection applications, the triazine is sprayed directly into the gas or mixed fluid stream, usually with an atomizing quill. Removal rate is dependent upon the $H_2S$ dissolution into the triazine solution, rather than the reaction rate. As a result, gas flow rate, contact time, and misting size & distribution contribute to the final scavenger performance. This method is excellent for removing $H_2S$ when there is good annular-mist flow and sufficient time to react. Most suppliers recommend a minimum of 15-20 seconds of contact time with the product for best results. Typical efficiencies are lower due to the $H_2S$ dissolution into the product, but ~40% removal efficiency can reasonably be expected. In order for direct injection to be effective, careful consideration of injection location and product selection must be used.

In a contactor tower, the feed gas is bubbled through a tower filled with triazine. As the gas bubbles up through the liquid, gas dissolves into the triazine and $H_2S$ is removed. The limiting factors in this application are the surface area of the bubble, the concentration of the solution, and bubble path time (contact time). Finer bubbles give a better reaction rate, but they can produce unwanted foaming. This application is not appropriate for high gas flow rates. Contactor towers have much greater $H_2S$ removal efficiencies, up to 80%. As a result, far less chemical is used and a significant reduction in operating expenditures ("OPEX") can be realized. However, the contactor tower and chemical storage take up significant space and weight, making them less practical for offshore application.

One mole of triazine reacts with two moles of $H_2S$ to form dithiazine, the main byproduct. An intermediate product is formed, but rarely seen. The R-groups that are released during the two-step reaction vary by the supplier and can be tailored for solubility. Continued reaction can result in the formation of an insoluble trithiane product.

Reacted triazine byproducts are readily biodegradable and relatively non-toxic. Unreacted, excess triazine has extremely high aquatic toxicity and a tendency to form carbonate scale with produced water or sea water; this can result in emulsion stabilization and increased overboard oil-in-water (OIW) content.

Unreacted triazine is also problematic for refineries as it impacts the desalting process and can cause accelerated corrosion within crude oil distillation units. It can also cause foaming in glycol and amine units and cause discoloration of glycol units. Unpleasant odor has also been reported with excess triazine usage, but some suppliers offer low-odor versions. Triazine itself is relatively safe to handle, but it can cause chemical burns upon contact.

Triazine and derivatives have been used successfully around the globe by many operators and facilities. It has been used in various other applications where control of low-concentration $H_2S$ is vital, including scale remediation and reservoir stimulation. It is commonly used with sour shale gas production in the US.

Triazine and derivatives are primarily used for removing low (<100 ppmv/mmscf) levels of $H_2S$. These can be applied using a contact tower to increase (up to twice) the efficiency of $H_2S$ removal, but $H_2S$ levels >200 ppmv/ mmscf will require the use of an amine-based sweetening unit. Triazine is also preferred in situations where the acid gas stream contains high levels of $CO_2$ in addition to $H_2S$. The triazine reacts preferentially with the H2S and the reaction is not inhibited by the $CO_2$, avoiding unnecessary chemical consumption. It is also preferred where a concentrated sour waste gas streams cannot be accommodated or disposed.

US 2018/291284 A1 "Microparticles For Capturing Mercaptans" published on Oct. 11, 2018, and is assigned to Ecolab. This now abandoned patent application describes and claims scavenging and antifouling nanoparticle compositions useful in applications relating to the production, transportation, storage, and separation of crude oil and natural gas, as well as oral hygiene. Also disclosed are methods of making the nanoparticle compositions as scavengers and antifoulants, particularly in applications relating to the production, transportation, storage, and separation of crude oil and natural gas, as well as oral hygiene.

Faeze Tari Et. Al., "Modified and Systematic Synthesis of Zinc Oxide-Silica Composite Nanoparticles with Optimum Surface Area as a Proper H2S Sorbent", Canadian Journal of Chemical Engineering, vol. 95, No. 4, 1 Apr. 2017, pages 737-743, describes work done to synthesize high surface area zinc oxide/silica composite nanoparticles via a facile and systemic process. Regarding the importance of surface area in application of such nanoparticles, variation of this factor was studied by change of reaction parameters including concentration of zinc acetate solution, pH, and calcination temperature via Response Surface method combined with Central Composite Design (RSM-CCD). . . . Comparison of two 0.1 g/g (10 wt %) ZnO/Silica samples with the optimum (337 $m^2g^{-1}$) and non-optimum (95 $m^2g^{-1}$) surface areas indicated that nanoparticles prepared at the optimum conditions with average diameter of about 18 nm showed a $H_2S$ adsorption capacity of about 13 mg per gram of sorbent.

U.S. Pat. No. 5,980,845, "Regeneration of Hydrogen Sulfide Scavengers", issued on Nov. 9, 1999. This now expired U.S. patent describes and claims sulfide scavenger solutions and processes that have high sulfide scavenging capacity, provide a reduction or elimination of solids formation and avoid the use of chemicals that pose environmental concerns. The invention utilizes a dialdehyde, preferably ethanedial, for the purpose of reacting with amines, amine carbonates, or other derivatives of amines that are liberated when certain scavenger solutions react with sulfides, including hydrogen sulfide and mercaptans. The scavenger solutions that have been discovered to liberate amines are those formed by a reaction between an amine and an aldehyde.

US 2013/004393 A1, "Synergistic Method for Enhanced H2S/Mercaptan Scavenging", issued as U.S. Pat. No. 9,463,989 B2 on Oct. 11, 2016. This patent describes and claims the use of a dialdehyde (e.g. glyoxal) and a nitrogen-containing scavenger (e.g. a triazine) when injected separately in media containing hydrogen sulfide ($H_2S$) and/or mercaptans to scavenge $H_2S$ and/or mercaptans therefrom gives a synergistically better reaction rate and overall scavenging efficiency, i.e. capacity, over the use of the dialdehyde or the nitrogen-containing scavenger used alone, but in the same total amount of the dialdehyde and nitrogen-containing scavenger. The media may include an aqueous phase, a gas phase, a hydrocarbon phase and mixtures of a gas and/or hydrocarbon phase with an aqueous phase.

US 2009/065445 A1, "Aromatic Imine Compounds for use as Sulfide Scavengers", issued as U.S. Pat. No. 7,985,881 B2 on Jul. 26, 2011. This patent describes and claims compositions and methods relating to aromatic imine compounds and methods of their use. The compounds are formed from aromatic aldehydes and amino or amino derivatives. The compounds and their derivatives are useful, for example, as hydrogen sulfide and mercaptan scavengers for use in both water and petroleum products.

US 2018/345212 A1, "Architectured Materials as Additives to Reduce or Inhibit Solid Formation and Scale Deposition and Improve Hydrogen Sulfide Scavenging" published on Dec. 6, 2018. This patent application describes and claims methods for scavenging hydrogen sulfides from hydrocarbon or aqueous streams and/or reducing or inhibiting solids or scale formation comprising introducing an additive made up of architectured materials such as star polymers, hyperbranched polymers, and dendrimers that may be used alone or in conjunction with aldehyde-based, triazine-based and/or metal-based hydrogen sulfide scavengers to an aqueous or hydrocarbon stream. A treated fluid comprising a fluid containing hydrogen sulfide and an additive for scavenging hydrogen sulfide or reducing or inhibiting solids and scale formation made up of architectured materials such as star polymers, hyperbranched polymers, and dendrimers. The fluid may further include aldehyde-based, triazine-based and/or metal-based hydrogen sulfide scavengers.

US 2014/155669 A1 , "Adsorbent Catalytic Nanoparticles and Methods of Using the Same" issued as U.S. Pat. No. 9,556,088 B2 on Jan. 31, 2017. This issued US patent describes and claims an adsorbent catalytic nanoparticle including a mesoporous silica nanoparticle having at least one adsorbent functional group bound thereto. The adsorbent catalytic nanoparticle also includes at least one catalytic material. In various embodiments, the present invention provides methods of using and making the adsorbent catalytic nanoparticles. In some examples, the adsorbent catalytic nanoparticles can be used to selectively remove fatty acids from feedstocks for biodiesel, and to hydrotreat the separated fatty acids.

SUMMARY OF THE INVENTION

The first aspect of the instant claimed invention is a process to remove $H_2S$ from a stream comprising the steps of a) adding a fluid comprising
   (i) an amine-functionalized silica nanoparticle composition, and
   (ii) a triazine, wherein the stream is selected from the group consisting of Oil streams, Gas streams, $CO_2$ point source purification streams and Geothermal Energy System streams.

The second aspect of the instant claimed invention is the process of the first aspect of the instant claimed invention in which the triazine is hexahydro-1,3,5-tris(hydroxyethyl)-s-triazine.

BRIEF DESCRIPTION OF THE FIGURES

FIG. 9 shows Allylic hydrogen containing surface functionalization silanes.

FIG. 10 shows Potential silanated co-activators.

FIG. 11 shows Potential silanated accelerator molecules.

DETAILED DESCRIPTION OF THE INVENTION

Figure 1:
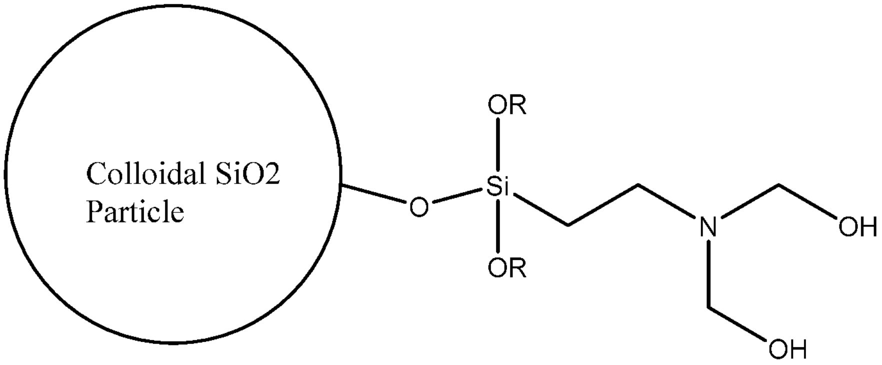
FIG. 1 shows a functionalized colloidal $SiO_2$ particle and a reaction scheme between an amine and $H_2S$.

For purposes of this patent application, silica nanoparticles include silica nanoparticles, alumina nanoparticles and silica-alumina nanoparticles.

The silica nanoparticles are sourced from all forms of precipitated $SiO_2$ a) dry silica;
b) fumed silica;
c) colloidal silica;
d) surface treated silicas including silicas reacted with organosilanes;
e) metal or metal-oxide with silica combinations; and
f) precipitated silica.

There are known ways to modify the surface of colloidal silica:

1. Covalent attachment of Inorganic oxides other than silica.
2. Non-covalent attachment of small molecule, oligomeric, or polymeric organic materials (PEG treatment, amines or polyamines, sulfides, etc.).
3. Covalent attachment of organic molecule including oligomeric and polymeric species:
   a. Reaction with organosilanes/titanates/zirconates/germinates.
   b. Formation of organosilanes/titanate/zirconate/germinate oligomers followed by reaction of these with surface of colloidal silica.
   c. Silanization followed by post-reaction formation of oligomeric/dendritic/hyperbranched/polymeric species starting from colloidal silica surface.
   d. Formation of oligomeric/dendritic/hyperbranched/polymeric silanes/zirconates/titanates followed by reaction to $SiO_2$ surface.

The silica particles included in the colloidal silica may have any suitable average diameter. As used herein, the average diameter of silica particles refers to the average largest cross-sectional dimension of the silica particle. In an embodiment, the silica particles may have an average diameter of between about 0.1 nm and about 100 nm. In an embodiment, the silica particles may have an average diameter of between about 1 nm and about 100 nm. In an embodiment, the silica particles may have an average diameter of between about 5 nm and about 100 nm. In an embodiment, the silica particles may have an average diameter of between about 1 nm and about 50 nm. In an embodiment, the silica particles may have an average diameter of between about 5 nm and about 50 nm. In an embodiment, the silica particles may have an average diameter of between about 1 nm and about 40 nm. In an embodiment, the silica particles may have an average diameter of between about 5 nm and about 40 nm. In an embodiment, the silica particles may have an average diameter of between about 1 nm and about 30 nm. In an embodiment, the silica particles may have an average diameter of between about 5 nm and about 30 nm. In an embodiment, the silica particles may have an average diameter of between about 7 nm and about 20 nm.

In an embodiment, the silica particles have an average diameter of less than or equal to about 30 nm. In another embodiment, the silica particles may have an average diameter of less than or equal to about 25 nm. In another embodiment, the silica particles may have an average diameter of less than or equal to about 20 nm. In another embodiment, the silica particles may have an average diameter of less than or equal to about 15 nm. In another embodiment, the silica particles may have an average diameter of less than or equal to about 10 nm. In another embodiment, the silica particles may have an average diameter of less than or equal to about 7 nm. In another embodiment, the silica particles may have an average diameter of at least about 5 nm. In another embodiment, the silica particles may have an average diameter of at least about 7 nm. In another embodiment, the silica particles may have an average diameter of at least about 10 nm. In another embodiment, the silica particles may have an average diameter of at least about 15 nm. In another embodiment, the silica particles may have an average diameter of at least about 20 nm. In another embodiment, the silica particles may have an average diameter of at least about 25 nm. Combinations of the above-referenced ranges are also possible.

Colloidal silica is a flexible technology medium, allowing for customized surface treatment based on application. In an embodiment, the silica is a GlycidoxyPropylTriMethoxySilane-functional silica. GPTMS-functionalized silica includes alkaline sol silica, available from Nissan Chemical America as ST-V3. Another GPTMS-functionalized silica is an acidic type of silica sol, available from Nissan Chemical America as ST-OV3.

The amount of silica nanoparticle used per unit of H2S is as follows:

In an embodiment, 1 unit of silica nanoparticle per 3 units of H2S, in another embodiment, 1 unit of silica nanoparticle per 5 units of H2S and in another embodiment, 1 unit of silica nanoparticle per 10 units of H2S.

The alumina nanoparticles are sourced from all forms of precipitated $Al_2O_3$ a) dry alumina;
b) fumed alumina;
c) colloidal alumina;
d) surface treated aluminas including aluminas reacted with organosilanes;
e) metal or metal-oxide with alumina combinations; and
f) precipitated alumina.

There are known ways to modify the surface of colloidal alumina:

1. Covalent attachment of Inorganic oxides other than alumina.
2. Non-covalent attachment of small molecule, oligomeric, or polymeric organic materials (PEG treatment, amines or polyamines, sulfides, etc.).
3. Covalent attachment of organic molecule including oligomeric and polymeric species:
   a. Reaction with organosilanes/titanates/zirconates/germinates.
   b. Formation of organosilanes/titanate/zirconate/germinate oligomers followed by reaction of these with surface of colloidal alumina.

c. Silanization followed by post-reaction formation of oligomeric/dendritic/hyperbranched/polymeric species starting from colloidal alumina surface.
d. Formation of oligomeric/dendritic/hyperbranched/polymeric silanes/zirconates/titanates followed by reaction to $Al_2O_3$ surface.

The alumina particles included in the colloidal alumina may have any suitable average diameter. As used herein, the average diameter of alumina particles refers to the average largest cross-sectional dimension of the alumina particle. In an embodiment, the alumina particles may have an average diameter of between about 0.1 nm and about 100 nm. In another embodiment, the alumina particles may have an average diameter of between about 1 nm and about 100 nm. In another embodiment, the alumina particles may have an average diameter of between about 5 nm and about 100 nm. In another embodiment, the alumina particles may have an average diameter of between about 1 nm and about 50 nm. In another embodiment, the alumina particles may have an average diameter of between about 5 nm and about 50 nm. In another embodiment, the alumina particles may have an average diameter of between about 1 nm and about 40 nm. In another embodiment, the alumina particles may have an average diameter of between about 5 nm and about 40 nm. In another embodiment, the alumina particles may have an average diameter of between about 1 nm and about 30 nm. In another embodiment, the alumina particles may have an average diameter of between about 5 nm and about 30 nm. In another embodiment, the alumina particles may have an average diameter of between about 7 nm and about 20 nm.

In an embodiment, the alumina particles have an average diameter of less than or equal to about 30 nm. In an embodiment, the alumina particles have an average diameter of less than or equal to about 25 nm. In an embodiment, the alumina particles have an average diameter of less than or equal to about 20 nm. In an embodiment, the alumina particles have an average diameter of less than or equal to about 15 nm. In an embodiment, the alumina particles have an average diameter of less than or equal to about 10 nm. In an embodiment, the alumina particles have an average diameter of less than or equal to about 7 nm. In an embodiment, the alumina particles have an average diameter of at least about 5 nm. In an embodiment, the alumina particles have an average diameter of at least about 7 nm. In an embodiment, the alumina particles have an average diameter of at least about 10 nm. In an embodiment, the alumina particles have an average diameter of at least about 15 nm. In an embodiment, the alumina particles have an average diameter of at least about 20 nm. In an embodiment, the alumina particles have an average diameter of at least about 25 nm. Combinations of the above-referenced ranges are also possible.

Colloidal alumina is a flexible technology medium, allowing for customized surface treatment based on application. In an embodiment, the alumina is a GPTMS-functional alumina. GlycidoxyPropylTriMethoxySilane-functional alumina includes alkaline sol silica, available from Nissan Chemical America as AT-V6. Another GPTMS-functionalized alumina is an acidic type of silica sol, available from Nissan Chemical America as AT-OV6.

The amount of alumina nanoparticle used per unit of H2S is as follows:
1 unit of alumina nanoparticle per 3 units of $H_2S$, in another embodiment, 1 unit of alumina nanoparticle per 5 units of H2S and in another embodiment, 1 unit of alumina nanoparticle per 10 units of H2S.

One major difficulty in the use of Triazine-based $H_2S$ scavenger is precipitation of unwanted reaction products onto inner surfaces of processing equipment. It is desirable to keep $H_2S$ reaction products soluble or dispersed in the fluid stream. Silica nanoparticles offer a flexible technological solution to this problem.

An embodiment of this invention is to attach amine-functional derivatives to the surface of nanoparticles where the amine functionality is chosen to perform a similar $H_2S$ scavenging mechanism similar to, for example, Hexahydro-1,3,5 (tris Hydroxyethyl)-s-Triazine. In this mechanism a mole of Sulfur is added to the Triazine ring liberating a mole of Ethanolamine as a leaving group. Commercially available organosilanes affording an Ethanolamine leaving group are an efficient way of providing this chemical mechanism to the surface of a readily dispersible nanop article. Multiples of this reaction can be performed at each nanoparticle surface yielding a multifunctional macromolecule able to scavenge many moles of $H_2S$ per nanoparticle.

In another embodiment of the invention, similar chemistry is performed as that outlined above utilizing other commonly available organosilanes having amino functionality.

Several amine functionalized silane derivatives are available for utilization through the below $H_2S$ amine trapping schema. The silane derivatives utilized as surface functionalization of nanoparticles e.g., silica nanoparticles.

The list of potential amine trapping silanes, as listed in Table 1, include but are not limited to N-Methylaminopropyltrimethoxysilane, 3-Aminopropyltrimethoxysilane, (N,N-Diethylaminomethyl)-t\Triethoxysilane, N-(2-Aminoethyl)-3 -Aminopropyltrimethoxysilane, 3-Aminopropylemethyldimethoxysilane, Tri(3-Trimethoxysilypropyl)isocyanurate, N-Butylaminopropyl-Trimethoxysilane, N-(3 -Triethoxysilyl-Propyl)-4,5-Dihydroimidazole. Triethoxysilylpropylethylcarbamate, Uridopropyltrimethoxysilane, N,N'-Bis(3-trimethoxysilylpropyl)Urea, 4-Amino-3,3-dimethylbutyltrimethoxysilane, N-Butylaminopropyltrimethoxysilane, N-(Trimethoxylsilyl-propyl)Ethylenediamine triacetate, (3-Trimethoxysilyl-Propyl)Diethylenetriamine, N,N'-Bis[(3-Trimethoxysilyl)Propyl] Ethylenediamine,

TABLE 1

| Chemical Structure | Chemical Name |
| --- | --- |
| 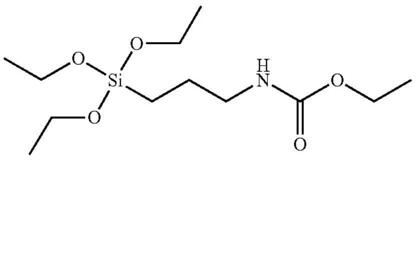 [SMILES: CCOC(=O)NCCC[Si](OCC)(OCC)OCC] | Triethoxysilylpropylethyl carbamate |

TABLE 1-continued
| Chemical Structure | Chemical Name |
|---|---|
| 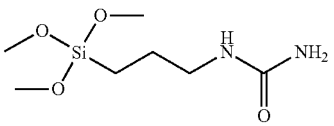 | UridopropylTMS |
| 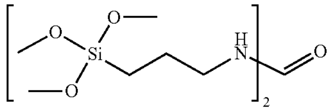 | N,N'-Bis(3-TMSPropyl) Urea |
| 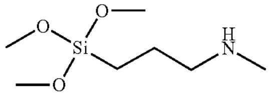 | N-Methylaminopropyl TMS |
| 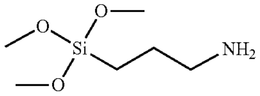 | 3-Aminopropyltrimethoxysilane |
| 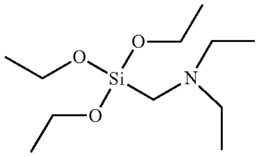 [SMILES: CCO[Si](CN(CC)CC)(OCC)OCC] | (N,N-Diethylaminomethyl) TES |
| 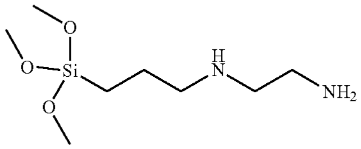 | N-(2-Aminoethyl)-3-Aminopropyltrimethoxysilane |
| 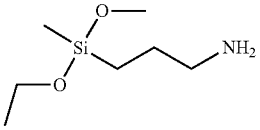 | 3-Aminopropylmethyl dimethoxysilane |
| 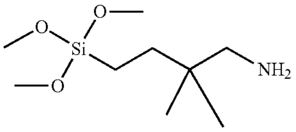 | 4-Amino-3,3-dimethylbutyl-TMS |
| 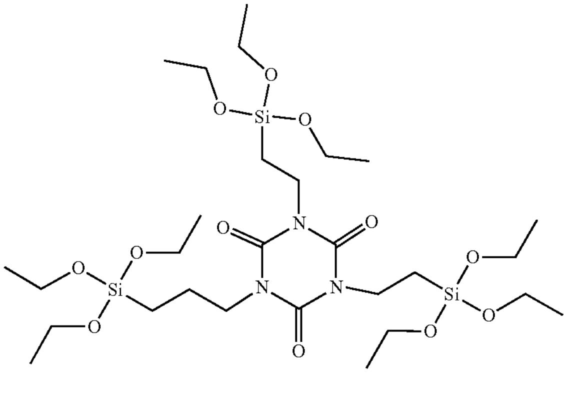 [SMILES: CCO[Si](CCCn1c(=O)n(CC[Si](OCC)(OCC)OCC)c(=O)n(CC[Si](OCC)(OCC)OCC)c1=O)(OCC)OCC] | Tris(3-Trimethoxysilylpropyl) isocyanurate |

TABLE 1-continued

| Chemical Structure | Chemical Name |
|---|---|
| 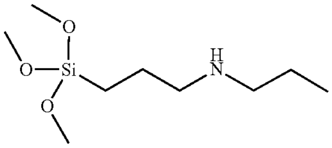 | n-ButylaminopropylTMS |
| 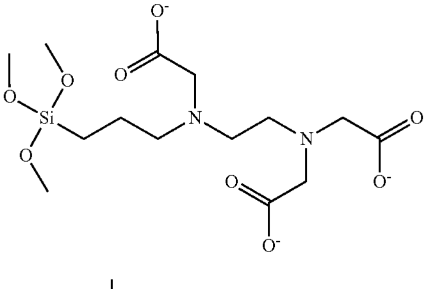 | N-(TMS-Propyl)Ethylenediamine triacetate |
| 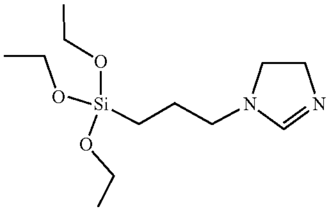 [SMILES: CCO[Si](CCCN1C=NCC1)(OCC)OCC] | N-(3-TES-Propyl)-4,5-Dihydroimidazole |
| 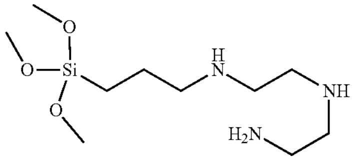 [SMILES: CO[Si](CCCNCCNCCN)(OC)OC] | (3-TMS-Propyl)Diethylenetriamine |
| 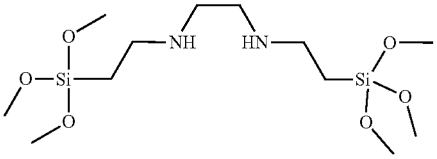 | N,N'-Bis[(3-TMSOPropyl] Ethylenediamine |

The surface functionalization of silica nanoparticles with an amine containing silane imparts the ability for the silica nanoparticle to absorb $H_2S$ to its surface. However, there are two problems with the introduction of silica nanoparticles in an oil and gas environment. Firstly, quaternary amine generation and secondly an acidic environment both of which tend to cause gelation of the silica particle.

Figure 2:
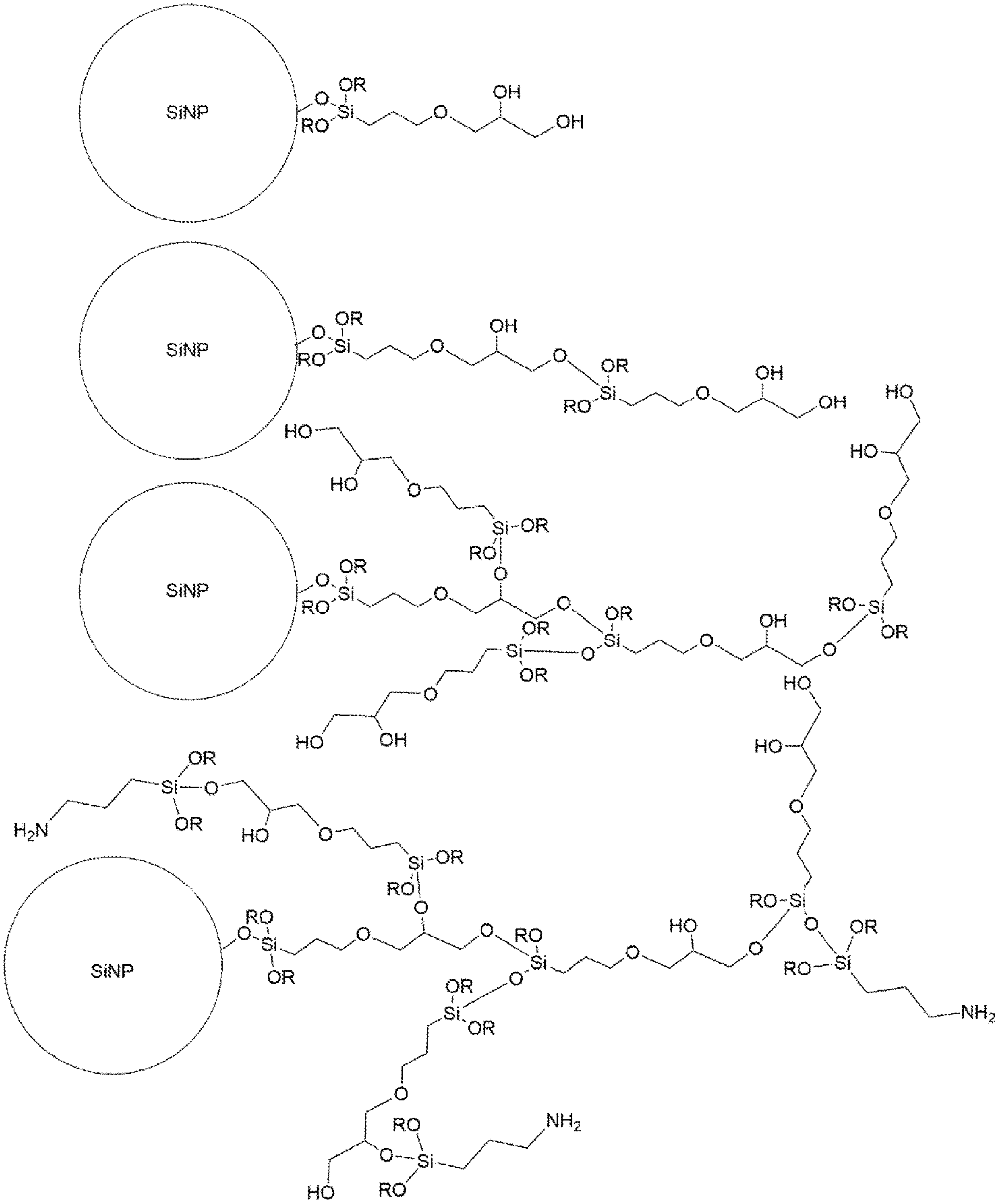
FIG. 2 shows multiple surface functionalization with GPTMS and amine silanes.

The conversion of the silica amine moiety surface decorated silica nanoparticles by either a primary, secondary, or tertiary amine by $H_2S$, as in FIG. 1, results in the conversion of a neutral amine moiety to a cationic quaternary amine moiety. The stability of dispersion of the amine moiety in this context will result in instability of the silica dispersion and possibly gelation of the silica dispersion. Generally, a stable dispersion is favored for many real-world applications. To maintain dispersion of the silica, additional silane surface functionalization by a "spacer" group to hinder gelation of the silica in the quaternary state is needed. Several, methods may exit which can help in this strategy such as surface functionalization of 3-Glycidyloxypropyltrimethoxysilane (GPTMS or GLYMO) or its oxytanyl derivatives onto the silica surface. The GPTMS, or its like, spacer reacting to the surface of the silica nanoparticle and, depending on the ratio of GPTMS to available silica surface, additionally react to the hydroxyl groups of the epoxy ring opened moiety of the surface reacted GPTMS thus creating a larger spacer which provides steric hindrance of a quaternary cationic amine generated during $H_2S$ scavenging. (see FIG. 2), The additional surface functionalization promotes stability against quaternary gelation onto the silica surface.

Figure 3:
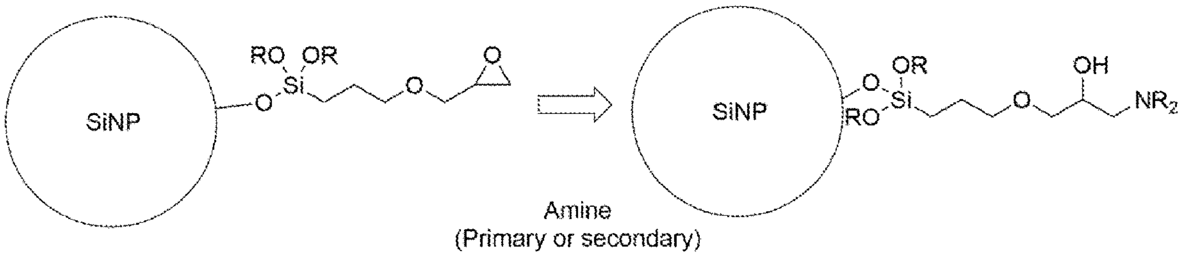
FIG. 3 shows functionalization of an amine moiety through ring opening of the GPTMS epoxide ring with a primary or secondary amine.

GPTMS functionalized silica as in commercially available products may be an ideal candidate for subsequent amine capping via nucleophilic ring opening utilizing any primary secondary or tertiary amine with an adequate leaving group as outlined in FIG. 3).

Figure 4:
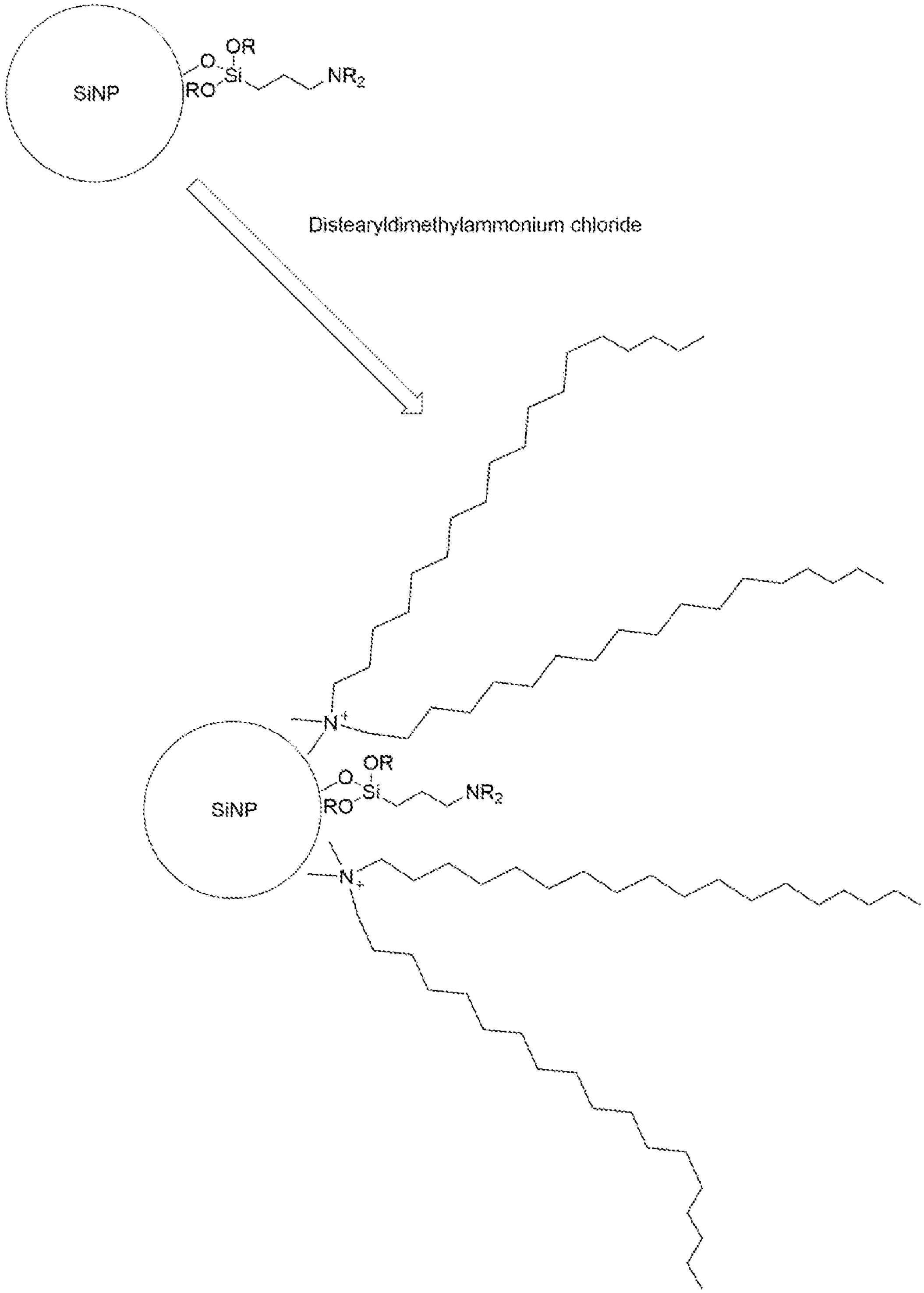
FIG. 4 shows a distearyldimethylammonium chloride spacer.

The amine attack of an epoxide ring is a well know resin curing reaction. Specifically, the amines utilized in $H_2S$ scrubbing, diethanolamine (DEA), monoethanolamine (MEA), methyldiethanolamine, (MDEA), Diisoproplamine (DIPA), Aminoethoxyethanol (Diglycolamine) (DGA) would react to the epoxy ring of GPTMS. Alternatively, the amine source may be melamine, a component of melamine cyanurate complex an industrial chemical supplied by Nissan Chemical. The result of the reaction being a melamine surface decorated silica nanoparticle with $H_2S$ sorbent capacity. Silane surface functionalization is just one method to inhibit gelation of the core silica nanoparticle. Depending on the method of application of a silica nanoparticle for $H_2S$ scavenging in the field a two-part application may be also of interest. In this method, a surfactant dispersant is utilized in conjunction with the amine surface functionalized silica nanoparticle. The dispersant may have a quaternary cationic surfactant head with a sufficient length of tail group and solubility in the application medium to sterically hinder the silica nanoparticles. The quaternary head being adjacent to the silica nanoparticle surface. Examples of these types of surfactants would be those surfactants that are utilized as fabric softeners. E.g., cetylbromide, diethyl ester dimethyl ammonium chloride (DEEDMAC), Triethanolamine quat (TEAQ), Hamburg ester quat (HEQ), distearydimethylammonium chloride. Of particular interest would be distearyldimethylammonium chloride as the lack of an ester group would be less labile to extremes of pH attack both of which will be expected in this $H_2S$ scavaging application as shown in FIG. 4.

Figure 5:
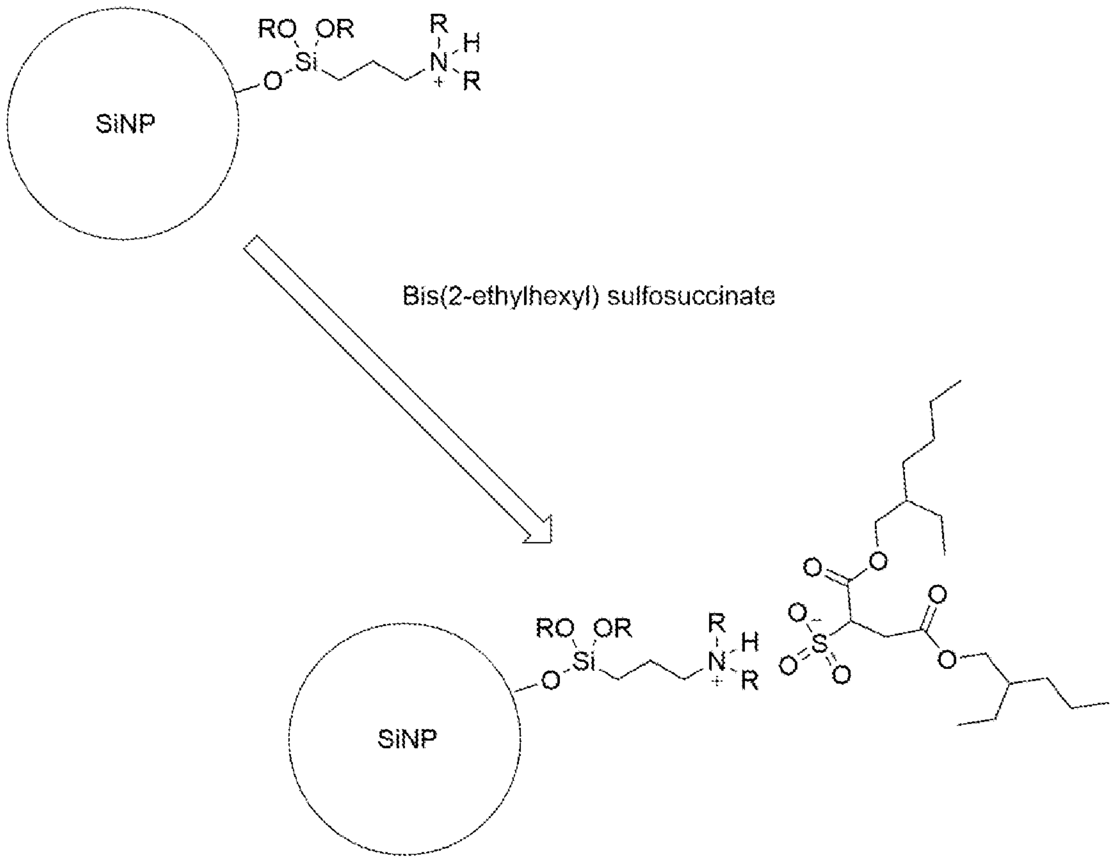
FIG. 5 shows Anionic surfactant dispersion strategy using AOT surfactant.

Alternatively, an anionic dispersant may be utilized to cap the quaternary amine surface functionalized silica nanoparticle. Suitable surfactants may be any zwitterionic or anionic surfactant with sufficient pendant tail to inhibit gelation of the silica nanoparticle. AOT may be a suitable dispersant as shown in FIG. 5.

Figure 6:
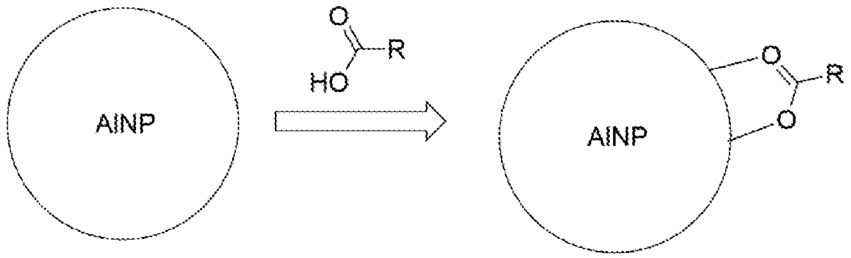
FIG. 6 shows Carboxylic acid functionalization of aluminum-oxy-hydroxide surface via the "alumoxane" method.

Depending on the field application for $H_2S$ savaging the environment that the nanoparticle will be dispersed into may have variable pH. For example, the dissolution of $H_2S$ into water results in generation of sulfuric acid. If the pH falls below a pH of 2, functionalized silica nanoparticles may gellate. To overcome the pH problem an ST-C or ST-AK particle may be utilized. Surface functionalization of the ST-C and ST-AK particle to provide amine functionality and thus $H_2S$ scavenging activity may be accomplished via the silane methods discussed above. An alternative method of functionalization of the aluminized surface of the particle is to utilize an alumoxane surface functionalization method whereby a carboxylic acid may be utilized to functionalize to the alumina surface of the nanoparticle having an amine pendent to the functionalization and thus imparting $H_2S$ scavenging activity as shown in FIG. 6.

Figure 7:
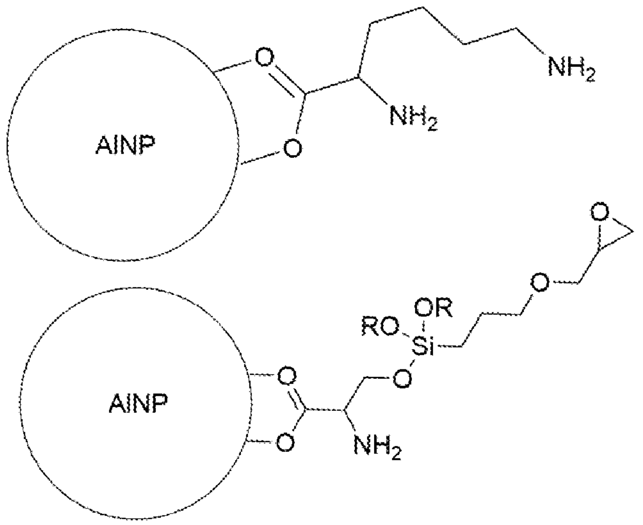
FIG. 7 shows Alumoxane functionalization strategy using amino acid carboxylic acid.

Amino acids typically are a good example of the types of carboxylic acids available for surface functionalization while also containing an amine for $H_2S$ scavenging. Using this functionalization strategy different moieties can be applied to the surface of the particle. For example, an alcohol containing moiety may be applied in first application with a subsequent silane functionalization at a later date. Both strategies are shown in FIG. 7.

Figure 8:
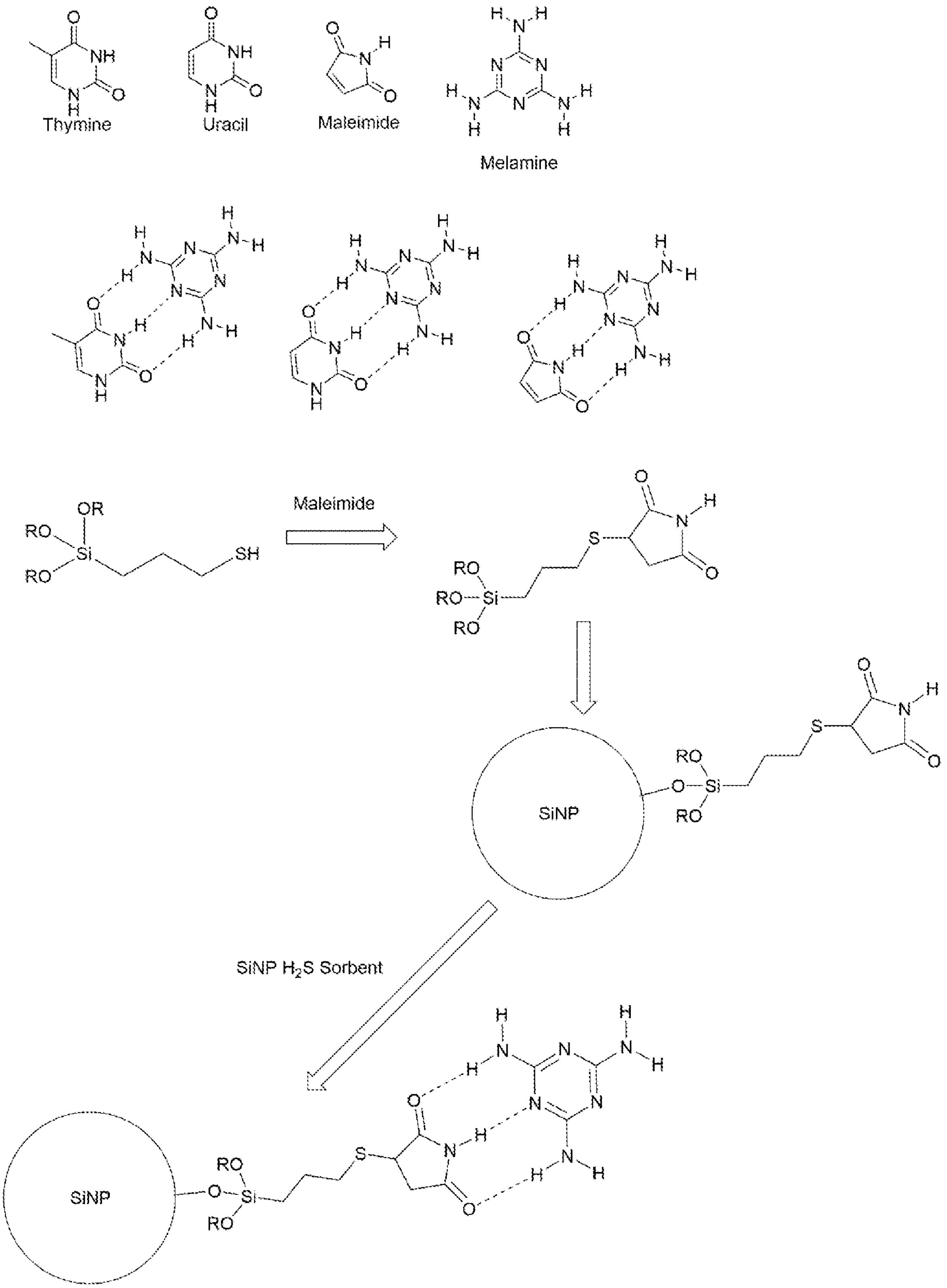
FIG. 8 shows Method to decorate a silica nanoparticle with melamine via co-operative binding creating a $H_2S$ sorbent.

Apart from creating a $H_2S$ reactive surface through the creation of some form of amine moiety. It may also be possible to enhance the $H_2S$ scavenging capacity of the silica nanoparticle through cooperative bonding to melamine creating a supramolecular nanoparticulate composite material as outlined in FIG. 8. In this figure we show three potential cooperative binding strategies to melamine. These being thymine, uracil, and maleimide. The maleimide molecule being of particular interest due to its industrial abundance as a cross-linking agent in many applications and its known reactivity of thiols to the double bond of maleimide molecule. Using these molecules, a cooperative surface functionalization molecule can be built which has affinity towards melamine thus providing a nanoparticle with a surface decorated with melamine and with enhanced $H_2S$ scavenging capacity. It is obvious that this strategy can be employed to other similar compounds such as the guanamine derivatives. The use of acetoguanamine instead of melamine would not have a cros slinking capacity. The cros slinking capability of melamine with the cooperative nanoparticle resulting in a change in material properties of the supramolecular nanoparticulate complex. The use of either one or the other being dependent on what field application is needed.

The ability to withstand an acidic environment with a high degree of dissolved $H_2SO_4$ can be envisaged as being desirable for a nanoparticle subjected to a high $H_2S$ aqueous environment. As discussed previously acidic environments cause gelation of silica nanoparticles. Below we describe a method of surface functionalizing a silica surface via vulcanization to create an ebonite shell. The ebonite shell having been shown to be a material of excellent resistance to $H_2SO_4$ so much so that the original containers for automotive batteries utilized ebonite. In previously published work the sulfur source was envisaged as being provided by the sulfur in the vapor phase from the helium well. In this invention the sulfur can be provided either from sulfur or other sources such as thiol or disulfide groups functionalized to the surface of the silica. Additionally, a hydrogen sulfide sorbent molecule such as triazine derivative, melamine derivative, or guanidine derivative may be compounded into the diene material prior to surface functionalization. The composite diene ebonite surface coating onto the surface of a silica nanoparticle enhances the particle in such a way as to carry the particle into a concentrated $H_2SO_4$ environment while having a $H_2S$ sorbent material embedded in the surface.

Another way of creating appropriate surface treatments is by conducting vulcanization of sulfur onto the surface of functionalized silica nanoparticles. The invention describes a method of using silica nanoparticles as a support and carrier for the components used in the vulcanization process. These components included an allylic hydrogen substrate, cationic activators, co-activators, and accelerators.

The allylic hydrogen substrate may be molecules, oligomers, or polymers. The allylic hydrogen substrate may be bonded to the silica nanoparticles using a silane. Please see FIG. 9 for examples. The allylic hydrogen substrate may also be in free solution for example as isoprene rubber (IR), or styrene-butadiene rubber (SBR), butadiene rubber (BR), nitrile butadiene rubber (NBR), norbornadiene, or as a mixture of these or other allylic hydrogen molecules. The mixture being, for example co-block polymers. The allylic hydrogen source may also be mixed with a $H_2S$ sorbent source such as melamine or its derivatives.

The cationic activators may be a cationic element or elements taken from the Alkali, Alkaline Earth Metals, Transition Metals, Metalloids, Other Metals, and/or Non-Metals. The cationic activator may be present on or within the silica nanoparticles in the form of individual atomistic cationic sites or as a larger island/nodule style deposition, or as a core-shell of silica nanoparticles-cationic sites respectively, or has a core-shell of cationic site-silica nanoparticles respectively, or as its own nanoparticle, or as a nanoparticle that is bound to the surface of the silica nanoparticle, or as a particle bound to a surface treatment, with the surface treatment being bound in some fashion to the surface of the silica nanoparticle. Or as a cationic ion which is ligated to a molecule which itself is bound to the surface of a nanoparticle. It is recognized that the cationic activators will most likely be an inorganic oxide. It is also recognized that the cationic activators may most likely be zinc or zinc oxide, cadmium or cadmium oxide, magnesium or magnesium oxide or lead and its oxides. The most likely candidate being zinc oxide.

The co-activators are recognized as being molecules which display solubility within a hydrophobic rubberized matrix but has a charged anionic site which allows adduct formation with the cationic activator. The most likely co-activators being fatty acids or derivatives thereof. Although it could also be assumed that any surfactant capable of forming an adduct with a vulcanizing capable cation will be considered a co-activator. It is recognized that the adduct of zinc with the stearate fatty acid being the most likely co-activator. The co-activator may be in free solution or may be bound to the silica surface in some fashion. Please see FIG. 10 for a list of potential silanated co-activators.

The accelerators are recognized as being molecules that provide a catalytic element to the vulcanization cure. They are used in conjunction with the activators and co-activators to form catalytic complexes to enhance sulfur crosslinking reaction time, crosslink density, reduce or increase the length of sulfur bridging. The accelerators include molecules from the chemical classes of thiazoles, thiurams, sulfonamides, guanidines, dithiocarbamates, xanthates, and thioureas. Some examples of common accelerators are bis (2-benzothiazole disulfide, 2-mercaptobenzothiazole, zinc salt of mercaptobenzothiazole, diphenyl guanidine, diortho-toyl guanidine, tetramethyl disulfide, dipentamethyl thiuram monosulfide, tetra thiuram disulfide, dipentamethylene thiuram tetrasulfide, 2-mercaptobenzothiazole having undergone a pre-reaction with any primary amine, zinc dimethyl dithiocarbamates, zinc diethyl dithiocarbamates, zinc dibutyl dithiocarbamates, zinc isopropyl xanthate, sodium isopropyl xanthate, ethylene thiourea, dipentamethylene thiourea, dibutyl thiourea. It is recognized for the purpose of this invention most any of the above accelerators could be utilized. The accelerators may be in free solution or may be bound to the silica nanoparticle surface. Please see FIG. 11 for a list of potential silanated accelerators.

It is recognized that active moieties of this invention disclosure namely allylic hydrogen substrate, activators, co-activators, accelerators may be surface functionalized to the Silica nanoparticles separately and the separate nanoparticles formulated in such a manner as to give the required vulcanization onto the surface of a Silica nanoparticles such that an ebonite or ebonite-melamine derivative silica nanoparticle shell is produced. In a different approach all the active moieties may be functionalized onto the surface of a single nanoparticle. In a third approach it may be that a combination of two actives may be surface functionalized onto the surface of one Silica nanoparticles with the remaining active surface functionalized onto a second Silica nanoparticles or in a fluid phase. In a fourth approach it may be one active anchored to the surface of the Silica nanoparticles with the remainder in a fluid state. It is recognized that a combination of any of these potential scenarios are possible to achieve vulcanization to an ebonitic or ebonitic-melamine material shell over the surface of the silica nanoparticle.

The nanoparticles used are grown, manufactured, and surface treated in a manner to make the nanoparticle fluidizable. The fluidized nanoparticle is manufactured in a way to allow it to be used to scavenge $H_2S$ Some examples of nanoparticles can include particles of spherical shape, fused particles such as fused silica or alumina or particles grown in an autoclave to form a raspberry style morphology, or elongated silica particles. The particles being bare, or surface treated. When surface treated may be polar or non-polar The surface treatment is sufficient to allow the nanoparticle to be stable during transportation to the area where a $H_2S$ sorbent is required and for delivery. The stability achieved either by covalent, charge-charge, dipole-dipole, or charge-dipole interactions.

Triazines useful in the instant claimed invention include, but are not limited to 1,2,3-triazine; 1,2,4-triazine and 1,3,5-triazine (aka s-triazine). Triazines useful in the instant claimed invention include Hexahydro-1,3,5-tris(hydroxyethyl)-s-triazine.

Triazines are alkaline and can cause carbonate scaling. Triazines are commercially available.

Triazines can be present in the process at a level of from about zero point 1 (0.1) units to about 1 unit per 3 units of H2S. Units could mean any quantitative measure, such as grams, pounds, mols, etc. etc.

$CO_2$ Point Source Purification is described in "Evaluation of $CO_2$ Purification Requirements and the Selection of Processes for Impurities Deep Removal from the $CO_2$ Product Stream", Zeina Abbas et al, *Energy Procedia, Volume* 37 , 2013, Pages 2389-2396. Depending on the reference power plant, the type of fuel and the capture method used, the $CO_2$ product stream contains several impurities which may have a negative impact on pipeline transportation, geological storage and/or Enhanced Oil Recovery (EOR) applications. All negative impacts require setting stringent quality standards for each application and purifying the $CO_2$ stream prior to exposing it to any of these applications.

In the Abbas paper, the $CO_2$ stream specifications and impurities from the conventional post-combustion capture technology are assessed. Furthermore, the $CO_2$ restricted purification requirements for pipeline transportation, EOR and geological storage are evaluated. Upon the comparison of the levels of impurities present in the $CO_2$ stream and their restricted targets, it was found that the two major impurities which entail deep removal, due to operational concerns, are oxygen and water from 300 ppmv to 10 ppmv and 7.3% to 50 ppmv respectively. Moreover, a list of plausible technologies for oxygen and water removal is explored after which the selection of the most promising technologies is made. It was found that catalytic oxidation of hydrogen and refrigeration and condensation are the most promising technologies for oxygen and water removal respectively.

"Geothermal Energy System Streams" are described as follows:

Hot water is pumped from deep underground through a well under high pressure.

When the water reaches the surface, the pressure is dropped, which causes the water to turn into steam.

The steam spins a turbine, which is connected to a generator that produces electricity.

The steam cools off in a cooling tower and condenses back to water.

EXAMPLES

Materials

Stepanquat 200 is a 78.5% actives solution of Hexahydro-1,3,5-tris(hydroxyethyl)-s-triazine available commercially from Stepan Corp.

ST-040, ST-30, ST-OV4, PGM-ST, ST-C, ST-V3, and MT-ST are commercially available colloidal silica products from Nissan Chemical America Corporation.

Organosilanes, Propylene Glycol Monomethyl Ether solvent, $NaHCO_3$, $CuCl_2$—$H_2O$, and Glyoxal were procured from Sigma Aldrich Corp.

Synthesis Example 1

1000 mL Snowtex® ST-30 from Nissan Chemical America Corporation (Aqueous alkaline colloidal silica dispersion, 30 wt % $SiO_2$ solids, 10-15 median particle size) was placed into a 2000 mL 4 neck glass reactor assembled with addition funnel, thermometer, heating mantle connected to voltage regulator, and mixer with 2 inch diameter trifoil mixing blade. Mixing was activated at 150 rpm and silicasol was brought to 50° C. Into the addition funnel was weighed 49.98 g of Aminoethylaminoethylaminopropyl Trimethoxysilane (CAS #35141-30-1, Sigma-Aldrich). Addition funnel was assembled to reactor top and silane was slowly added to stirring silicasol at a drop rate of 2 drops per second. After all organosilane had been added to reaction the mixture was allowed to stir at 50° C. for a period of 3 hours. Finished surface-treated alkaline silica was poured off to a 2 L Nalgene bottle for storage and use.

Synthesis Example 2

1.4 L Snowtex® O-XS (Aqueous acidic colloidal silica dispersion, 10 wt % colloidal silica median particle size 5 nm) was transferred to a 4-neck reaction kettle. To this vessel were also added 9.6 L distilled water. Copper (II) Chloride dehydrate ($CuCl_2$—$H_2O$, Sigma Aldrich), 13.87 g were added to the reaction flask and allowed to dissolve at room temperature under light agitation. A stock solution ("Solution A") of $NaHCO_3$ (Sigma Aldrich ACS reagent grade, ≥99.7% was prepared (47.04 g $NaHCO_3$ dissolved in 12.6 L distilled water, 0.04 M final concentration). The stir rate in the reaction vessel was increased to 9500 rpm to achieve vigorous agitation. Solution A was added slowly 10-15 mL per minute to the reaction via addition funnel. After Solution A was added completely the reaction was allowed to stir at room temperature for 30 minutes and contents were removed for storage and use.

Synthesis Example 3

Snowtex® PGM-ST (Solvent borne dispersion of acidic colloidal silica, 30 wt % SiO2 median particle size 10-15 nm dispersed in Propylene Glycol Monomethyl ether), 450 g were placed into a 1000 mL 4-neck reaction flask. Similar to Synthesis Example 1 the reactor was assembled with mixer, thermometer, and heating mantle/voltage regulator. A 4.05 g portion of 3-Mercaptopropyl Trimethoxysilane (Sigma Aldrich) were added to an addition funnel and assembled to the reactor. PGM-ST was brought to 50° C. under mild agitation and Mercaptopropyl trimethoxysilane was added dropwise via addition funnel at 1 drop/second until addition was complete. Reaction was kept at 50° C. for a period of 3 hours, then the surface-treated silicasol was poured off to a Nalgene container for storage and use.

Example 1, Comparative

Into a 1000 mL Nalgene bottle were placed 300 g distilled $H_2O$, 300 g Propylene Glycol Monomethyl Ether ("PGM") solvent, and 300 g Stepanquat 200. Contents were mixed thoroughly by shaking container vigorously for 30 seconds.

Example 2

Into a 1000 mL Nalgene bottle were placed 300 g distilled $H_2O$, 300 g Propylene Glycol Monomethyl Ether solvent, and 300 g Synthesis Example 1 fluid. Contents were mixed thoroughly by shaking container vigorously for 30 seconds.

Example 3, Comparative

Into a 1000 mL Nalgene bottle were placed 700 g distilled $H_2O$, and 300 g Stepanquat 200. Contents were mixed thoroughly by shaking container vigorously for 30 seconds.

Example 4

Into a 1000 mL Nalgene bottle were placed 300 g distilled $H_2O$, 300 g ST-O40 (Aqueous acidic colloidal silica available from Nissan Chemical America Corporation) , and 300 g Stepanquat 200. Contents were mixed thoroughly by shaking container vigorously for 30 seconds.

Example 5

Into a 1000 mL Nalgene bottle were placed 300 g distilled $H_2O$, 300 g Synthesis Example 2 fluid, and 300 g Stepanquat 200. Contents were mixed thoroughly by shaking container vigorously for 30 seconds.

Example 6

Into a 1000 mL Nalgene bottle were placed 300 g distilled $H_2O$, 300 g ST-OV4 (Aqueous acidic hydrophilic surface treated colloidal silica available from Nissan Chemical America Corporation), and 300 g Stepanquat 200. Contents were mixed thoroughly by shaking container vigorously for 30 seconds.

Example 7

Into a 1000 mL Nalgene bottle were placed 300 g distilled $H_2O$, 300 g Synthesis Example 3 fluid, and 300 g Stepanquat 200. Contents were mixed thoroughly by shaking container vigorously for 30 seconds.

Example 8

Into a 1000 mL Nalgene bottle were placed 375 g aqueous solution of Glyoxal (Sigma Aldrich, 37.5 wt %) and 625 g ST-C (Aqueous alkaline colloidal silica dispersion partially surface treated with Aluminum Oxide available from Nissan Chemical America Corporation) . Contents were mixed thoroughly by shaking container vigorously for 30 seconds.

Example 9

Into a 1000 mL Nalgene bottle were placed 375 g aqueous solution of Glyoxal (Sigma Aldrich, 37.5 wt %) and 625 g ST-O40 (Aqueous acidic colloidal silica dispersion available from Nissan Chemical America Corporation) . Contents were mixed thoroughly by shaking container vigorously for 30 seconds.

Example 10

Into a 1000 mL Nalgene bottle were placed 375 g aqueous solution of Glyoxal (Sigma Aldrich, 37.5 wt %) and 625 g ST-V3 (Aqueous alkaline hydrophilic surface treated colloidal silica dispersion available from Nissan Chemical America Corporation). Contents were mixed thoroughly by shaking container vigorously for 30 seconds.

Example 11

Into a 1000 mL Nalgene bottle were placed 375 g aqueous solution of Glyoxal (Sigma Aldrich, 37.5 wt %) and 625 g MT-ST (Solvent borne acidic colloidal silica dispersed in Methanol, 30 wt % SiO2, 10-15nm median particle size, available from Nissan Chemical America Corporation). Contents were mixed thoroughly by shaking container vigorously for 30 seconds.

Example 12: Comparative

Into a 1000 mL Nalgene bottle were placed 375 g aqueous solution of Glyoxal (Sigma Aldrich, 37.5 wt %) and 625 g distilled $H_2O$. Contents were mixed thoroughly by shaking container vigorously for 30 seconds.

MEA Triazine was kept at a constant concentration across all the Inventive and Comparative examples. Similarly, Glyoxal concentration was kept constant across all Inventive and Comparative examples.

Testing for Removal of H2S

Each solution tested was equilibrated for weight at 300 g total solution and placed into a vessel with overhead port to measure $H_2S$ content in the vessel headspace. The headspace port was connected to a Dräger Pac® 3500 gas monitor (Drägerwerk AG&Co. KGaA). A mixed gas of 10% $H_2S$/90% Nitrogen was bubbled through the test solution at a standard rate of 475 mL/minute, solution held at 22° C., and headspace monitored for $H_2S$ content. A reading of 0 means the sensor is not detecting any $H_2S$ in the flow gas stream after the gas has passed through the tested solution. Vessel headspace was monitored for $H_2S$ content once per minute continuously until a $H_2S$ content of 40 reading on gas monitor was reached, at which point the test example in solution reacting with $H_2S$ was considered to be consumed and the experiment stopped. Times to initial $H_2S$ reading and Time to complete $H_2S$ breakthrough were recorded and compared to controls/comparative examples.

Summary of Results

The Number of minutes is listed is how long the detector detected a value of "0" for H2S. The Table is ordered from best performance in terms of removal of H2S to worst performance.

| Example | Time to initial H2S reading (minutes) | Time to 40% H2S reading (minutes) | Composition | nanoparticle type |
|---|---|---|---|---|
| 2 | 124 | 160 | Triazine + Water + Amine func. SiO2 | Amine-Functional SiO2 |
| 1 | 117 | 145 | Triazine + Water + PGMsolvent (Comparative Example) | none |
| 8 | 107 | 184 | Glyoxal + ST-C | Aluminum oxide functional SiO2 |
| 4 | 71 | 164 | Triazine + Water + ST-O40 | Aqueous acidic SiO2 |
| 10 | 55 | 146 | Glyoxal + ST-V3 | Glycidoxy functional SiO2, alkaline |
| 5 | 55 | 139 | Triazine + Water + CuOXS | Transition Metal functional SiO2 |
| 7 | 55 | 105 | Triazine + Water + Mercapto functionalized PGM-ST | Mercapto Functional SiO2 |
| 9 | 51 | 86 | Glyoxal + ST-O40 | Aqueous acidic SiO2 |
| 3 | 44 | 61 | Triazine + Water (Comparative Example) | none |
| 6 | 39 | 153 | Triazine + Water + ST-OV4 | Glycidoxy functional SiO2, acidic |
| 12 | 8 | 14 | Glyoxal + Water (Comparative Example) | none |
| 11 | 1 | 2 | Glyoxal + MT-ST | Solventborne SiO2, acidic |

OBSERVATIONS ABOUT THE EXAMPLES

1. Example 1: This is a Triazine controls/comparative examples with MEA Triazine dissolved in a mixture of water and PGM solvent. This example performed very well, much better than MEA Triazine alone at the same concentration dissolved in water. It is believed, without intending to be bound there bye, that it is possible PGM is actually very beneficial in Triazine+H2S reaction.
2. Example 2 (Amine-functional SiO2 combined with Triazine) performed very well compared to the comparative example, with improved/delayed time to initial H2S breakthrough and also time to final breakthrough (when the H2S readings reached a 40% level in the headspace above the sample).
3. Example 3 is the Triazine+water control, these times were used comparatively for all the Triazine+nanosilica examples. Example 3 exemplifies the standard field grade fluid of MEA Triazine fluid for treatment of sour gas.
4. Example 4 (ST-O40, Aqueous acidic silica+Triazine) performed the best of all Triazine+nanosilica examples. It is believed, without intending to be bound thereby, that the solid acidity of the acidic silica surface is likely acting as a catalyst to make the Triazine+H2S reaction more complete, leading to greatly improved/delayed time to initial and complete H2S breakthrough.
5. Example 5 (Copper functionalized nanosilica+Triazine) performed relatively well in improved/delayed time to initial and complete H2S breakthrough. This example is the only example of Transition Metal functional silica. (It is noted that the Aluminum present in Example 8 is not considered a true Transition metal, as it is a “Post Transition Metal”.)
6. Example 6 (ST-OV4+Triazine) is aqueous acidic silica functionalized with hydrophilic organic surface treatment and is commercially available from Nissan Chemical America. This example had slightly worse time to H2S initial breakthrough, but had a greatly improved time to complete H2S breakthrough compared to the control (Example 3).
7. Example 7 (Mercapto-functional nanosilica dispersed in PGM+Triazine)—Slightly improved time to initial H2S breakthrough and much improved time to complete H2S breakthrough. It is believed, without intending to be bound thereby, that the Mercapto surface functionality can disrupt polymer formation in the Triazine+H2S reaction.
8. Example 8 is ST-C (Aqueous alkaline colloidal silica with Aluminum Oxide surface) combined with Glyoxal. Compared to Glyoxal alone this combination of ST-C+Glyoxal showed dramatic improvements in both time to initial and time to complete H2S breakthrough. The Glyoxal+nanosilica examples performed relatively well. It is noted that the Aluminum present in Ex. 8 is not considered a true Transition metal, as it is a “Post Transition Metal”.
9. Example 9 (ST-O40+Glyoxal) performed much better than Glyoxal alone.
10. Example 10 (ST-V3, Aqueous alkaline silica with hydrophilic organic surface treatment+Glyoxal) performed very well compared to Glyoxal alone.
11. Example 11 (Acidic silica dispersed in Methanol) did not perform well, this example had the worst results of all. It is believed, without intending to be bound thereby that MT-ST completely deactivated Glyoxal from reacting with H2SJ
12. Example 12 is the solution of Glyoxal and water only, a comparative example with no added nanotechnology.

The invention claimed is:

1. A process to remove $H_2S$ from a stream comprising the step of (A) adding to the stream a fluid comprising (i) an amine-functionalized silica nanoparticle composition, and (ii) hexahydro-1,3,5-tris(hydroxyethyl)-s-triazine, wherein the amine-functionalized silica nanoparticle composition comprises silica nanoparticles functionalized with an amine selected from the group consisting of N-methylaminopropyltrimethoxysilane, 3-aminopropyltrimethoxysilane, (N,N-diethylaminomethyl)-triethoxysilane, N-(2-aminoethyl)-3-aminopropyltrimethoxysilane, 3-aminopropylemethyldimethoxysilane, tri(3-trimethoxysilypropyl)isocyanurate, N-butylaminopropyl-trimethoxysilane, N-(3-triethoxysilyl-propyl)-4,5-dihydroimidazole, triethoxysilylpropylethylcarbamate, uridopropyltrimethoxysilane, N,N'-bis (3-trimethoxysilylpropyl) urea, 4-amino-3,3-dimethylbutyltrimethoxysilane, N-butylaminopropyltrimethoxysilane, N-(trimethoxylsilyl-propyl)ethylenediamine triacetate, (3-trimethoxysilyl-propyl)diethylenetriamine, and N,N'-bis [(3-trimethoxysilyl)propyl]ethylenediamine; and wherein the stream is selected from the group consisting of Oil streams, Gas streams, $CO_2$ point source purification streams-and Geothermal Energy System streams.

2. A process to remove H2S from a stream comprising the step of (A) adding to the stream a fluid comprising (i) an amine-functionalized silica nanoparticle composition, and (ii) a triazine, in which the triazine is selected from the group consisting of 1,2,3-triazine and 1,2,4-triazine, wherein the amine-functionalized silica nanoparticle composition comprises silica nanoparticles functionalized with an amine selected from the group consisting of N-methylaminopropyltrimethoxysilane, 3-aminopropyltrimethoxysilane, (N,N-diethylaminomethyl)-triethoxysilane, N-(2-aminoethyl)-3-aminopropyltrimethoxysilane, 3-aminopropylemethyldimethoxysilane, tri(3-trimethoxysilypropyl)isocyanurate, N-butylaminopropyl-trimethoxysilane, N-(3-triethoxysilyl-propyl)-4,5-dihydroimidazole, triethoxysilylpropylethylcarbamate, uridopropyltrimethoxysilane, N, N'-bis(3-trimethoxysilylpropyl)urea, 4-amino-3,3-dimethylbutyltrimethoxysilane, N-butylaminopropyltrimethoxysilane, N-(trimethoxylsilyl-propyl)ethylenediamine triacetate, (3-trimethoxysily)propyl)diethylenetriamine, and N, N'-bis[(3-trimethoxysilyl)propyl] ethylenediamine; and wherein the stream is selected from the group consisting of Oil streams, Gasstreams, CO2 point source purification streams and Geothermal Energy System streams.

3. The process of claim 1 in which the stream is an Oil stream.

4. The process of claim 1 in which the stream is a Gas stream.

5. The process of claim 1 in which the stream is a $CO_2$ point source purification stream.

6. The process of claim 1 in which the stream is a Geothermal Energy System stream.

7. The process of claim 2 in which the stream is an Oil stream.

8. The process of claim 2 in which the stream is a Gas stream.

9. The process of claim 2 in which the stream is a $CO_2$ point source purification stream.

10. The process of claim 2 in which the stream is a Geothermal Energy System stream.

11. The process of claim 1, wherein the amine-functionalized silica nanoparticle composition comprises silica nanoparticles functionalized with (3-trimethoxysilyl-propyl)diethylenetriamine.

12. The process of claim 2, wherein the amine-functionalized silica nanoparticle composition comprises silica nanoparticles functionalized with (3-trimethoxysilyl-propyl)diethylenetriamine.

* * * * *